(12) United States Patent
Beeson et al.

(10) Patent No.: US 11,235,433 B2
(45) Date of Patent: Feb. 1, 2022

(54) DUST COLLECTOR WITH FILTER CLEANING MECHANISM

(71) Applicant: MILWAUKEE ELECTRIC TOOL CORPORATION, Brookfield, WI (US)

(72) Inventors: Joseph R. Beeson, West Allis, WI (US); Daryl S. Richards, Sussex, WI (US); Tyler S. Sigafoose, Pewaukee, WI (US); Cheng Liang Zhang, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 163 days.

(21) Appl. No.: 16/226,712

(22) Filed: Dec. 20, 2018

(65) Prior Publication Data
US 2019/0193225 A1     Jun. 27, 2019

Related U.S. Application Data

(60) Provisional application No. 62/649,891, filed on Mar. 29, 2018, provisional application No. 62/609,369, filed on Dec. 22, 2017.

(51) Int. Cl.
*B23Q 11/00* (2006.01)
*B23B 45/00* (2006.01)
(Continued)

(52) U.S. Cl.
CPC .......... *B23Q 11/0071* (2013.01); *B01D 46/04* (2013.01); *B23B 45/003* (2013.01);
(Continued)

(58) Field of Classification Search
CPC .. B23Q 11/0046; B25D 16/006; B25D 17/24; B23B 47/00; B01D 35/16
(Continued)

(56) References Cited

U.S. PATENT DOCUMENTS 2,384,707 A * 9/1945 Sweet ...................... B25D 5/02
30/367
3,172,204 A * 3/1965 Frey ......................... B25D 5/02
30/367
(Continued)

FOREIGN PATENT DOCUMENTS

CN    206296530 U    7/2014
DE    202010009989 U1    2/2012
(Continued)

OTHER PUBLICATIONS

Dewalt, "DWH304DH Dust Extraction System with HEPA Filter Instruction Manual," 2015, 28 pages.

*Primary Examiner* — Thanh K Truong
*Assistant Examiner* — David G Shutty
(74) *Attorney, Agent, or Firm* — Michael Best & Friedrich LLP

(57) ABSTRACT

A dust collector for use with a power tool comprises a housing, a telescoping suction pipe coupled to the housing, a suction fan positioned in the housing and operable to generate a vacuum in the suction pipe, a dust container coupled to the housing and positioned upstream of the fan, a filter at least partially arranged in the dust container, and a filter cleaning mechanism. The filter cleaning mechanism includes an anvil, a striker moveable between a first striker position, in which the striker is spaced from the anvil, and a second striker position, in which the striker is in contact with the anvil. The filter cleaning mechanism further includes an actuator moveable between a first actuator position and a second actuator position, in which the actuator is moved closer to the anvil than in the first position, and a first spring biasing the striker toward the anvil.

20 Claims, 16 Drawing Sheets

(51) Int. Cl.
*B01D 46/04* (2006.01)
*B25F 5/02* (2006.01)
*B01D 46/00* (2006.01)

(52) U.S. Cl.
CPC ...... *B23Q 11/0046* (2013.01); *B01D 46/0075* (2013.01); *B23B 2270/30* (2013.01); *B23B 2270/62* (2013.01); *B25F 5/029* (2013.01)

(58) Field of Classification Search
USPC ........................................................ 173/198
See application file for complete search history.

(56) References Cited

U.S. PATENT DOCUMENTS

| | | | | |
|---|---|---|---|---|
| 3,639,940 | A * | 2/1972 | Carlson | A47L 9/20 15/352 |
| 3,710,552 | A * | 1/1973 | Genton | B01D 46/0075 55/291 |
| 3,797,064 | A * | 3/1974 | MacFarland | A47L 9/20 15/351 |
| 4,099,940 | A * | 7/1978 | Mortensen | A47L 9/20 55/300 |
| 4,383,840 | A * | 5/1983 | Jones | B01D 46/0075 55/283 |
| 4,661,129 | A * | 4/1987 | Nederman | B01D 46/521 96/408 |
| 6,315,647 | B1 | 11/2001 | Ghilardi | |
| 6,391,073 | B1 | 5/2002 | Koga | |
| 6,949,130 | B1 * | 9/2005 | Grey | A47L 9/1666 55/305 |
| 7,118,609 | B2 | 10/2006 | Valentini | |
| 7,186,281 | B2 | 3/2007 | Cheng | |
| 7,282,074 | B1 | 10/2007 | Witter | |
| 7,520,017 | B2 * | 4/2009 | Wilmo | E01H 1/042 15/78 |
| 7,644,469 | B2 * | 1/2010 | Beers | A47L 9/2805 15/319 |
| 7,871,463 | B2 | 1/2011 | Hayama et al. | |
| 7,962,994 | B2 | 6/2011 | Beers | |
| 7,966,691 | B2 | 6/2011 | Takahashi et al. | |
| 8,266,761 | B2 | 9/2012 | Beers | |
| 8,272,134 | B2 | 9/2012 | Soika et al. | |
| 8,327,487 | B2 * | 12/2012 | Kunz | A47L 9/2842 15/3 |
| 8,388,415 | B2 * | 3/2013 | Soika | F02M 35/0245 451/178 |
| 8,561,512 | B2 | 10/2013 | Lovelass et al. | |
| 9,221,110 | B2 | 12/2015 | Guth | |
| 9,545,710 | B2 * | 1/2017 | Boice | B25D 5/02 |
| 10,864,609 | B2 * | 12/2020 | Mori | B23Q 11/0071 |
| 2006/0260281 | A1 | 11/2006 | Peng | |
| 2009/0019710 | A1 | 1/2009 | Grossman et al. | |
| 2010/0116261 | A1 * | 5/2010 | Fairweather | B23Q 11/0067 125/13.01 |
| 2012/0273243 | A1 * | 11/2012 | Tada | B23Q 11/0071 173/198 |
| 2013/0213683 | A1 * | 8/2013 | Brewster | B23Q 11/0046 173/198 |
| 2013/0283563 | A1 * | 10/2013 | Fry | B01D 46/0075 15/347 |
| 2015/0251117 | A1 * | 9/2015 | Madonia | B01D 35/02 134/6 |
| 2015/0351288 | A1 * | 12/2015 | Fukuda | B01D 46/0065 361/679.48 |
| 2016/0016270 | A1 * | 1/2016 | Batres | B23Q 11/0046 83/100 |
| 2016/0100724 | A1 | 4/2016 | Valentini | |
| 2017/0056988 | A1 | 3/2017 | Guth | |
| 2017/0232565 | A1 * | 8/2017 | Machida | B25F 5/00 173/198 |
| 2018/0280857 | A1 * | 10/2018 | Ullrich | B01D 46/0076 |
| 2019/0193225 | A1 * | 6/2019 | Beeson | B23B 45/003 |
| 2019/0350422 | A1 * | 11/2019 | Liu | A47L 9/20 |
| 2020/0077852 | A1 * | 3/2020 | Bayha | B23Q 11/0071 |
| 2020/0121146 | A1 * | 4/2020 | Ohlendorf | B01D 46/04 |

FOREIGN PATENT DOCUMENTS

| | | |
|---|---|---|
| DE | 102011075013 A1 | 10/2012 |
| EP | 0130747 A2 | 1/1985 |
| EP | 2011594 A2 | 1/2009 |
| EP | 2481522 A2 | 7/2012 |
| EP | 2011992 B1 | 11/2014 |
| GB | 2043483 A | 10/1980 |
| WO | 2017040124 A1 | 3/2017 |
| WO | 2017040730 A1 | 3/2017 |

* cited by examiner

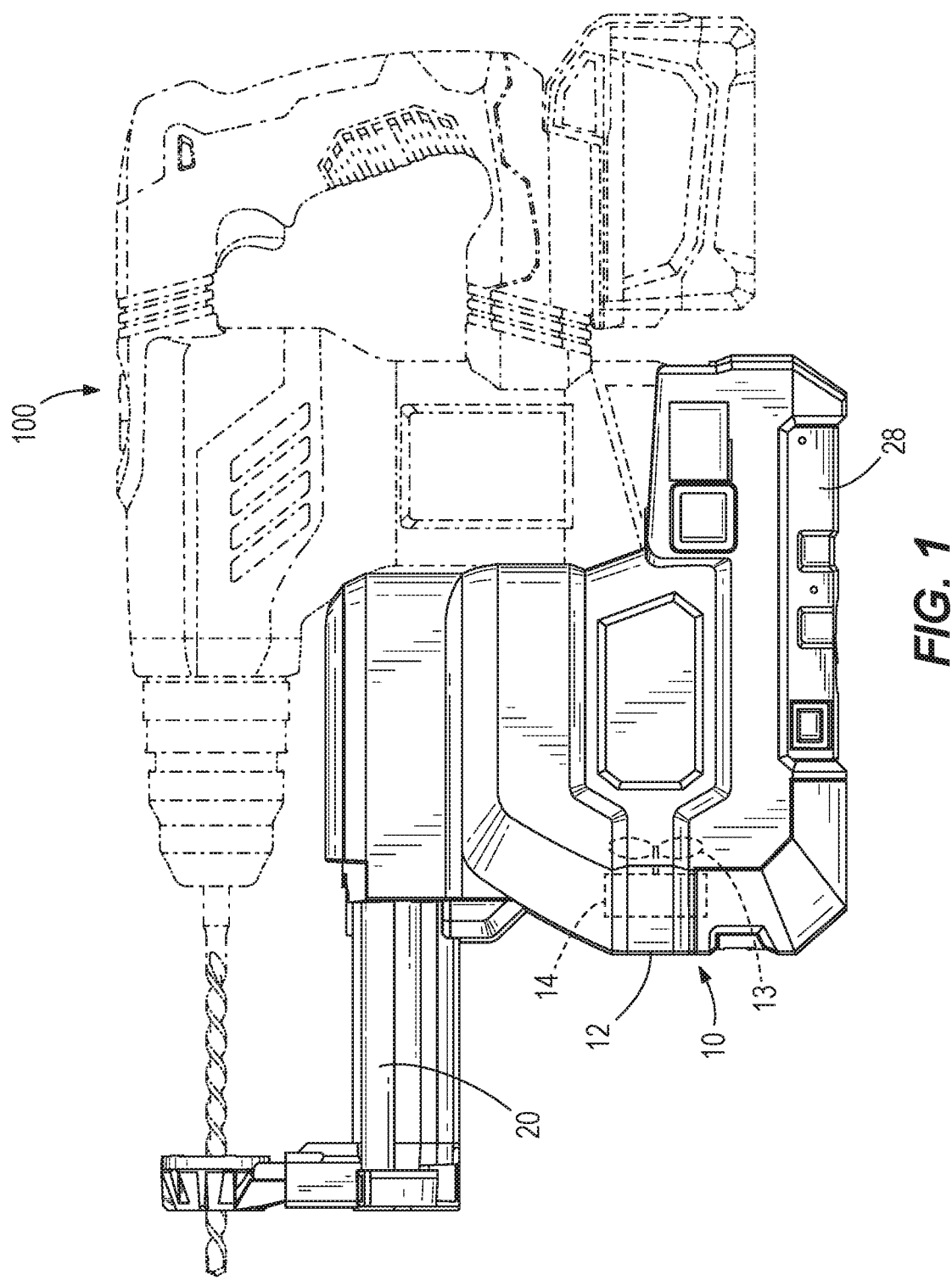

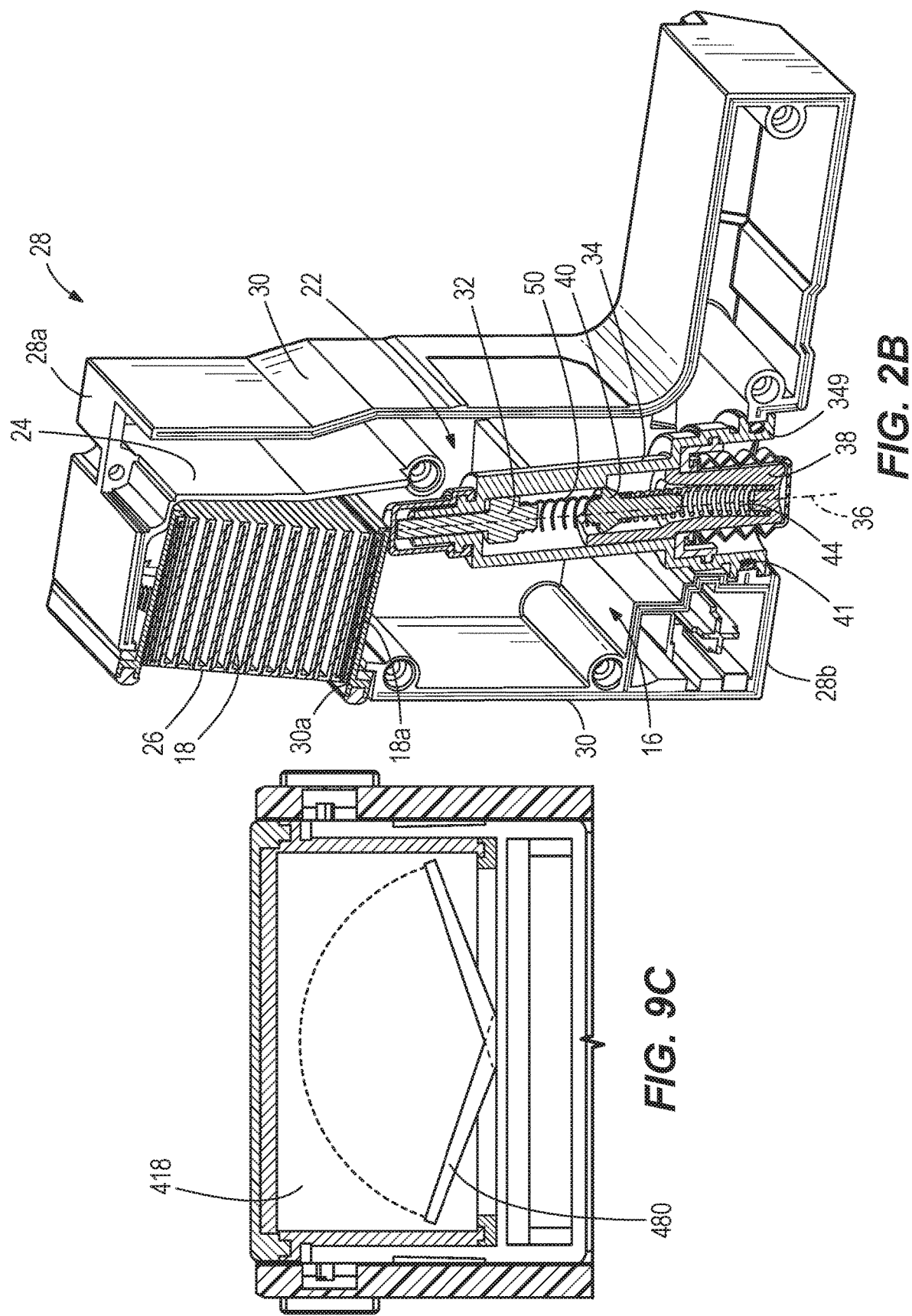

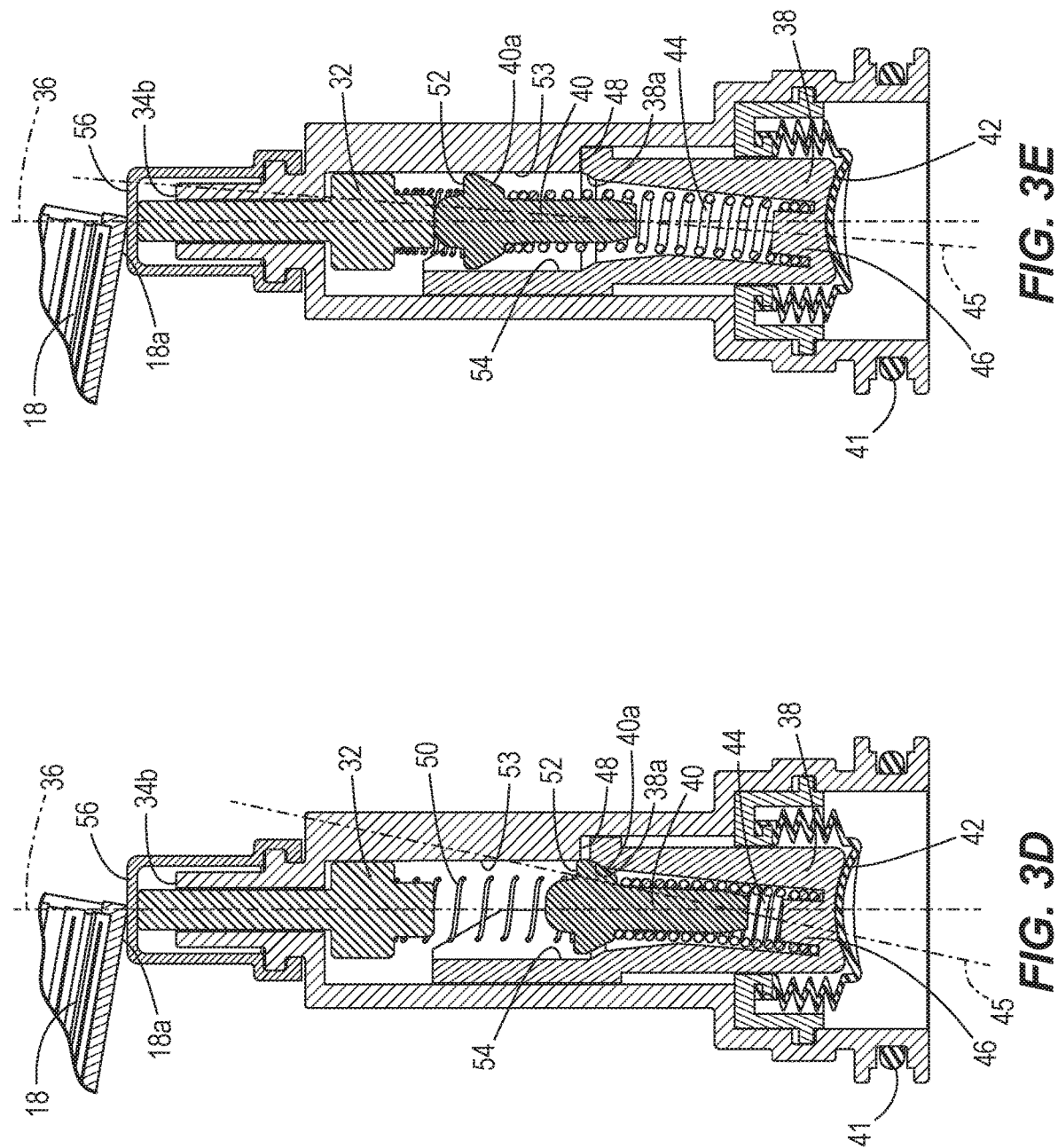

DUST COLLECTOR WITH FILTER CLEANING MECHANISM

CROSS-REFERENCE TO RELATED APPLICATIONS

This application claims priority to co-pending U.S. Provisional Patent Application No. 62/609,369, filed on Dec. 22, 2017, and co-pending U.S. Provisional Patent Application No. 62/649,891, filed on Mar. 29, 2018, the entire contents of which are incorporated herein by reference.

FIELD OF THE INVENTION

The present invention relates to power tools, and more particularly to dust collectors for use with power tools.

BACKGROUND OF THE INVENTION

Dust collectors are typically used in tandem with hand-held drilling tools such as rotary hammers to collect dust and other debris during a drilling operation to prevent dust and other debris from accumulating at a worksite. Such dust collectors may be attached to a rotary hammer to position a suction inlet of the collector proximate a drill bit attached to the rotary hammer. Such dust collectors may also include an on-board dust container in which dust and other debris is accumulated. Such dust collectors are often removable from the dust collector to facilitate disposal of the accumulated dust and debris.

SUMMARY OF THE INVENTION

The present invention provides, in one aspect, a dust collector for use with a hand-held power tool, the dust collector including a housing, a telescoping suction pipe coupled to the housing, a suction fan positioned in the housing and operable to generate a vacuum in the suction pipe, a dust container coupled to the housing and positioned upstream of the fan, a filter at least partially arranged in the dust container, and a filter cleaning mechanism including an anvil, a striker moveable between a first striker position, in which the striker is spaced from the anvil, and a second striker position, in which the striker is in contact with the anvil, an actuator moveable between a first actuator position and a second actuator position, in which the actuator is moved closer to the anvil than in the first position, and a first spring biasing the striker toward the anvil. In response to the actuator being depressed, the actuator is moved from the first actuator position to the second actuator position and the first spring moves the striker from the first striker position to the second striker position, such that the anvil impacts the filter, thereby dislodging dust and other debris therefrom.

The present invention provides, in another aspect, a dust collector for use with a hand-held power tool, the dust collector including a housing, a telescoping suction pipe coupled to the housing, a suction fan positioned in the housing and operable to generate a vacuum in the suction pipe, a dust container coupled to the housing and positioned upstream of the fan, a filter at least partially arranged in the dust container, and a filter cleaning mechanism including a mechanism housing having an internal shoulder, an anvil arranged within the mechanism housing and defining an anvil axis, a striker arranged within the mechanism housing and moveable between a first striker position, in which the striker is engaged against the internal shoulder and spaced from the anvil, and a second striker position, in which the striker is disengaged from the shoulder, in contact with the anvil, and coaxial with the anvil axis, an actuator moveable between a first actuator position and a second actuator position, in which the actuator is moved closer to the anvil than in the first position, the actuator including an actuator contact portion, and a spring biasing the striker against the internal shoulder of the mechanism housing. In response to movement of the actuator from the first actuator position to the second actuator position, the actuator contact portion moves the striker off of the shoulder and the spring moves the striker from the first striker position to the second striker position.

The present invention provides, in another aspect, a dust collector for use with a hand-held power tool, the dust collector including a housing, a telescoping suction pipe coupled to the housing, a suction fan positioned in the housing and operable to generate a vacuum in the suction pipe, a dust container coupled to the housing and positioned upstream of the fan, a filter at least partially arranged in the dust container, and a filter cleaning mechanism including a carrier pivotably coupled to the dust container about a carrier axis, a cleaning element coupled to the carrier and extending transversely to the carrier axis, the cleaning element element being within the dust container and in contact with the filter, and a knob coupled for co-rotation with the carrier and positioned outside the dust container, wherein rotation of the knob pivots the carrier and the cleaning element about the carrier axis, such that the cleaning element is moved across the filter to dislodge dust and other debris from the filter.

The present invention provides, in another aspect, a dust collector including a housing, a telescoping suction pipe coupled to the housing, a suction fan positioned in the housing and operable to generate a vacuum in the suction pipe, a dust container coupled to the housing and positioned upstream of the fan, a filter at least partially arranged in the dust container, and a filter cleaning mechanism including a ratchet housing arranged against the filter, a ratchet member configured to rotate within the housing, and a pawl member configured to vibrate the ratchet housing, and thus the filter, in response to rotation of the ratchet member against the pawl member, thereby dislodging dust and other debris from the filter.

The present invention provides, in another aspect, a dust collector including a housing, a telescoping suction pipe coupled to the housing, a suction fan positioned in the housing and operable to generate a vacuum in the suction pipe, a dust container coupled to the housing and operable to generate a vacuum in the suction pipe, a filter at least partially arranged in the dust container, the filter including a first end, a second end, a plurality of pleats arranged between the first end and the second end, and a plurality of valleys, each valley arranged between a pair of adjacent pleats, and a filter cleaning mechanism including a sweeper having at least one blade arranged within each valley, a biasing member biasing the sweeper toward the first end of the filter and away from the second end of the filter, and a pull cord coupled to the sweeper, the pull cord configured to pull the sweeper along the filter from the first end to the second end, such that the blade moves within the valley between the first end and the second end to dislodge dust and other debris from the filter.

Other features and aspects of the invention will become apparent by consideration of the following detailed description and accompanying drawings.

BRIEF DESCRIPTION OF THE DRAWINGS

FIG. 1 is a perspective view of a dust collector in accordance with an embodiment of the invention attached to a rotary power tool.

FIG. 2B is a side cross-sectional view of the dust container of FIG. 2A.

FIGS. 3A-3E are cross-sectional views of a filter cleaning mechanism of the dust container of FIG. 2A.

FIG. 9C is an enlarged cross-sectional view of the dust container of FIG. 9A.

Figure 2A:
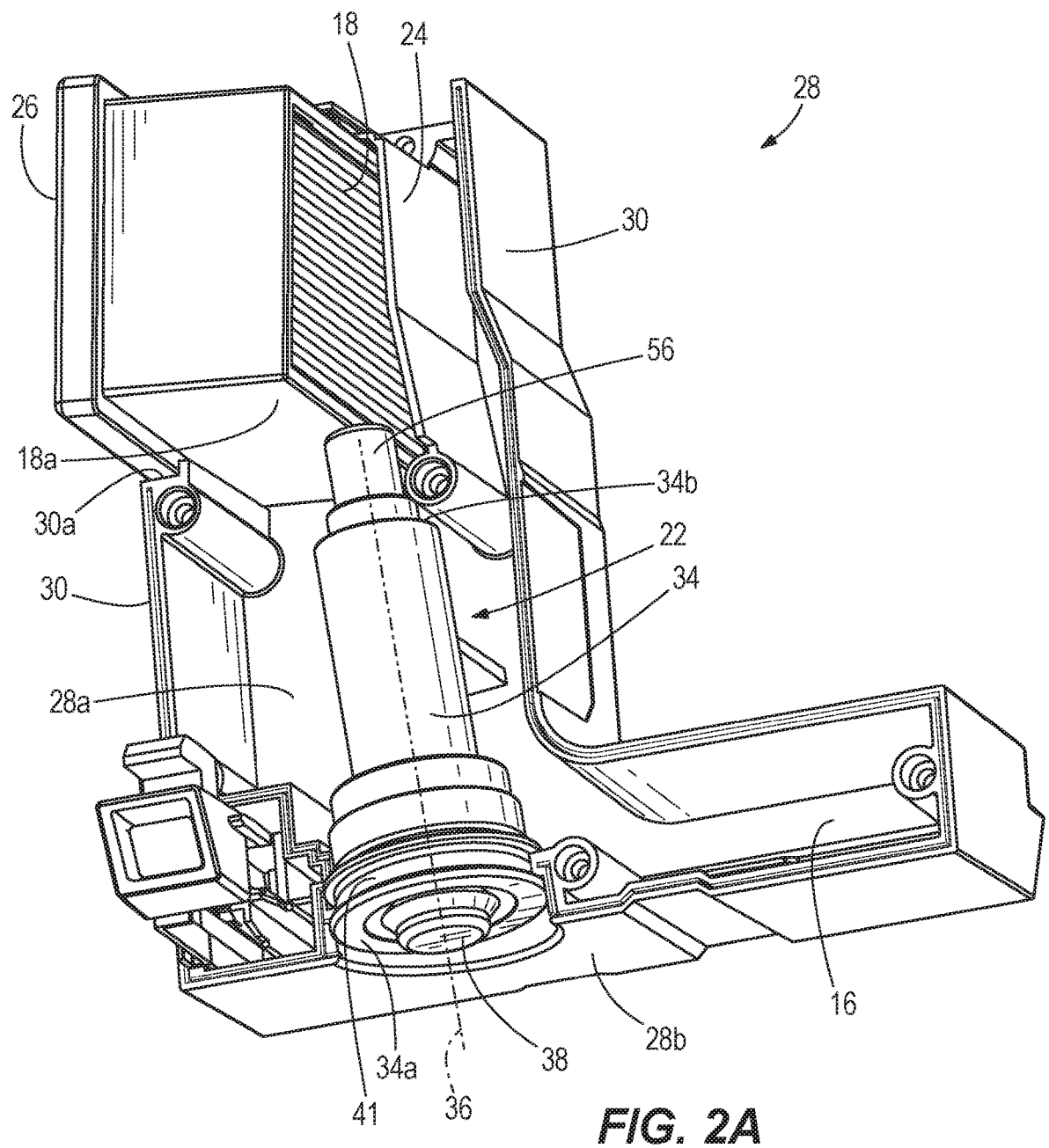
FIG. 2A is a perspective view of a dust container of the dust collector of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 1 illustrates a rotary power tool 100 equipped with a dust suction device or dust collector 10 in accordance with an embodiment of the invention. The dust collector 10 is separate from the rotary power tool 100, and may be attached to and detached from the rotary power tool 100 so that the power tool 100 may be used without the dust collector 10. Accordingly, the rotary power tool 100 may or may not be equipped with the dust collector 10 depending on the requirement of the application.

The dust collector 10 includes a housing 12 and a telescoping suction pipe 20 coupled to the housing 12 through which dust and other debris is drawn into the housing 12. The dust collector 10 also includes a dust container 28, a high efficiency particulate air ("HEPA") filter 18 positioned in the dust container 28 (FIGS. 2A and 2B), a suction fan 13 (FIG. 1) positioned downstream of the filter 18, and an electric motor 14 for rotating the suction fan 13. When rotated by the electric motor 14, the suction fan 13 is operable to generate a vacuum within the suction pipe 20 to draw dust and other debris into the dust container 28.

With reference to FIG. 2A, the dust collector 10 further includes a filter cleaning mechanism 22 positioned within the dust container 28 for cleaning the filter 18. During a drilling and/or hammering operation performed by the power tool 100, dust-laden air travels through the suction tube 20 and into a dust collection chamber 16 of the dust container 28, where debris is collected. The air stream continues through the filter 18 before being exhausted out of the container 28 via an outlet end 26 of the filter 18.

The dust container 28 is a selectively attachable to the housing 12. The dust container 28 includes an inlet 24 for a dust laden air stream and an outlet defined by the outlet end 26 of the filter 18. More specifically, the dust container 28 includes opposite side walls 28a and a bottom wall 28b extending between the side walls 28a. The side walls 28a and the bottom wall 28b partially define the dust collection chamber 16. The dust container 28 additionally includes end walls 30 adjacent each of the side walls 28a and the bottom wall 28b, and an opening 30a in one of the end walls 30 through which the filter 18 is received. The dust container 28 is operable to collect dust and other debris from a workpiece during the drilling and/or hammering operation performed by the power tool 100 to maintain the user's work area is substantially clear of dust. Because the dust container 28 is detachable from the housing of the dust collector 10, the dust container 28 may be removed to allow an operator to empty the dust from the dust collection chamber 16.

With reference to FIGS. 3A-3E, the filter cleaning mechanism 22 includes a mechanism housing 34 having an anvil 32 defining an anvil axis 36 and a striker 40 for striking the anvil 32. The mechanism housing 34 includes a first end 34a protruding out of the dust container 28 and an opposite second end 34b proximate a bottom side 18a of the filter 18. An O-ring 41 is arranged between the first end 34a and the bottom wall 28b of the dust container 28 to prevent dust and debris collected in the dust collection chamber 16 from escaping the dust container 28. The striker 40 is biased toward the anvil 32 by a first spring 44 that is seated about a perch 46 of an actuator 38, which at least partially surrounds the striker 40. The perch 46 defines a perch axis 45 that is offset relative to the anvil axis 36 by an angle α that is between about 0 and 30 degrees. In the illustrated embodiment, the angle α is approximately 10 degrees.

The striker 40 is biased away from anvil 40 by a second spring 50 seated on the anvil 40. In the embodiment illustrated in FIGS. 2A, 2B and 3A-3E, the first and second springs 44, 50 are compression springs. The second spring 50 has a stiffness that is less than a stiffness of the first spring 44. The striker 40 is moveable between a first striker position (FIG. 3A), in which the striker 40 is spaced from the anvil 40, and a second striker position (FIG. 3E), in which it is in contact with the anvil 32. Specifically, in the first striker position, an annular shoulder 52 of the striker 40 is caught against an internal shoulder 48 of the mechanism housing 34 due to the biasing force of the first spring 44. In the embodiment illustrated in FIGS. 2A, 2B and 3A-3E, the actuator 38 is a button moveable between a first actuator position and a second actuator position, in which the actuator 38 is moved closer to the anvil 32 than in the first position. The actuator 38 includes a bellows 42 on its outer surface, which is engageable by a user for depression of the actuator 38. A cap 56 is arranged over the second end 34b of the mechanism housing 34 and is engaged against both the anvil 32 and the bottom side 18a of the filter 18.

Figure 3C:
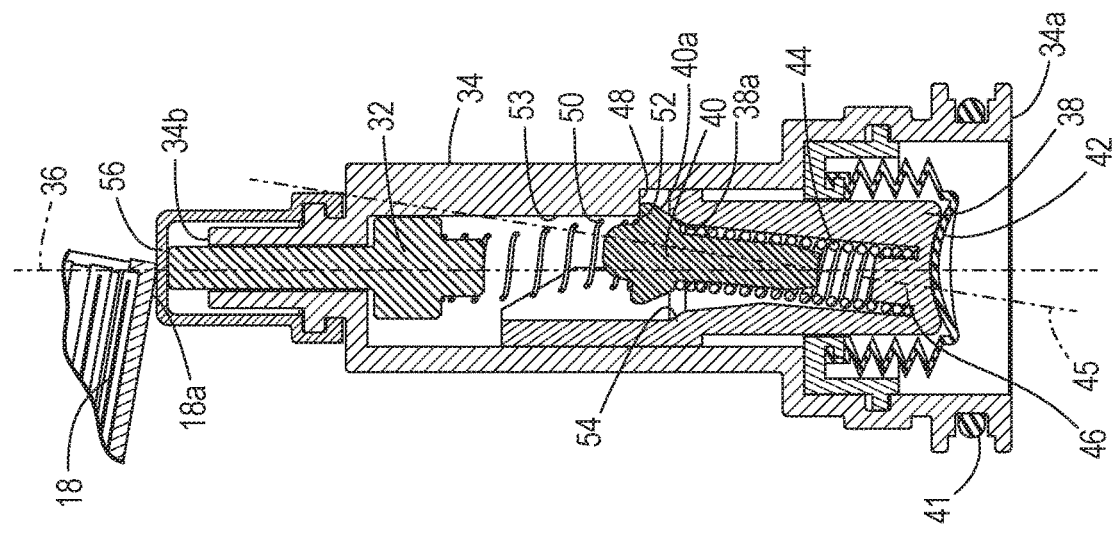
Figure 3B:
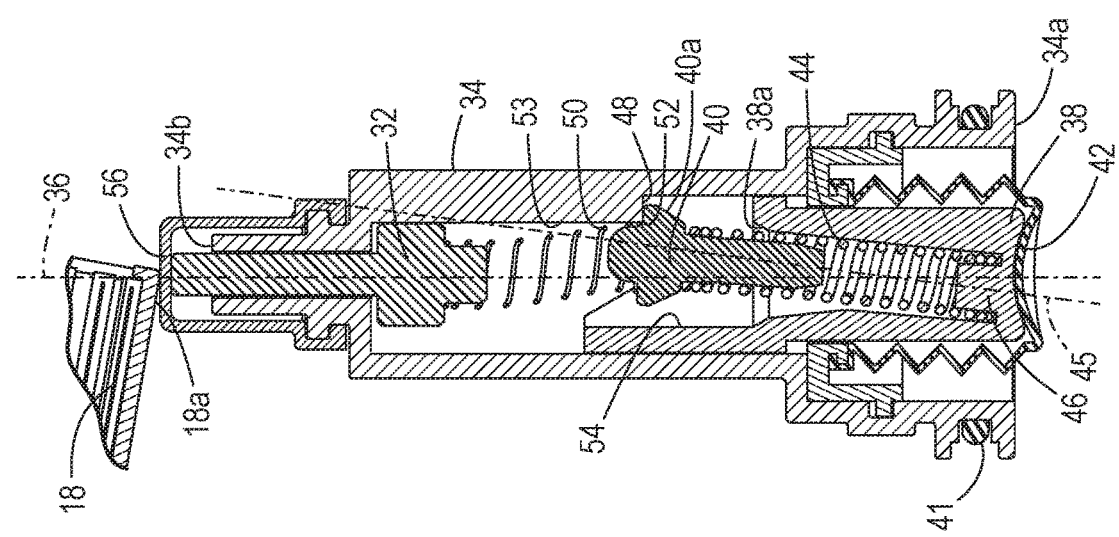
Figure 3A:
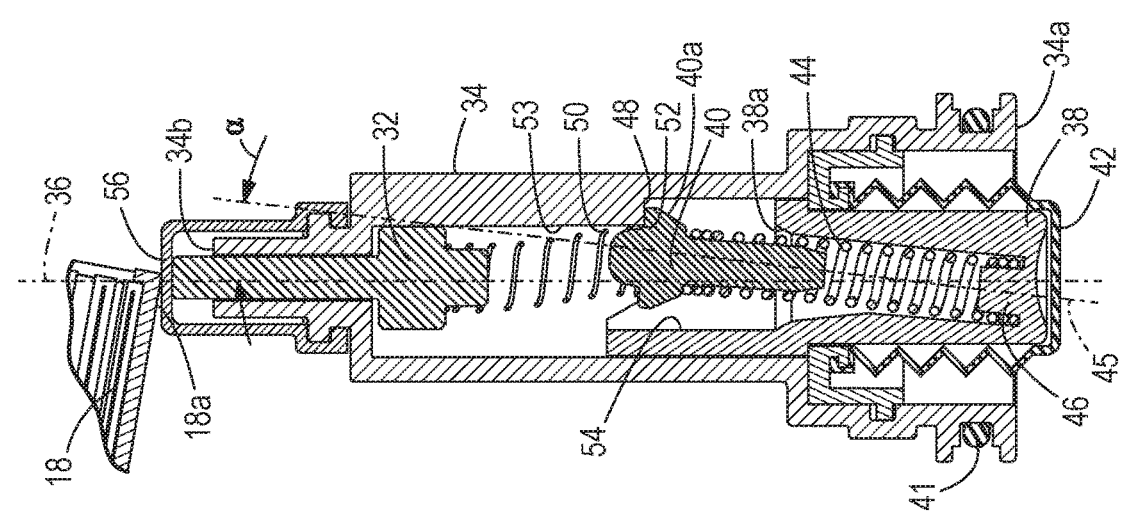

FIGS. 3A-3E illustrate the operation of the filter cleaning mechanism 22. FIG. 3A illustrates the mechanism 22 in an initial (pre-operational) state. The striker 40 is in the first striker position such that the annular shoulder 52 of the striker 40 is caught against an internal shoulder 48 of the mechanism housing 34 due to the biasing force of the first spring 44. As the actuator 38 is initially depressed from its first position toward its second position, the first spring 44 becomes increasingly compressed and the striker 40 remains on the internal shoulder 48 (FIGS. 3B and 3C) until an annular tapered cam surface 38a on the interior of the actuator 38, which partly defines the bore in which the first spring 44 is located, contacts an annular tapered follower surface 40a on the exterior of the striker 40, pushing the striker 40 off the internal shoulder 48 (FIG. 3D).

Once the striker 40 has been pushed off the internal shoulder 48, the first spring 44 rebounds, releasing the stored potential energy of the first spring 44 and displacing the striker 40 toward the second striker position, in which it strikes the anvil (FIG. 3E). In addition, because the spring constant of the second spring 50 is less than the spring constant of the first spring 44, the rebounding first spring 44 transfers part of its stored energy into the second spring 50, causing the second spring 50 to compress. As the striker 40 travels between the position in FIG. 3D, in which it has been pushed off the internal shoulder 48, and the second striker position in FIG. 3E, the striker 40 is reoriented by an internal side 54 of the actuator 38 to be coaxial with the anvil axis 36, such that the striker 40 moves along the internal side 54 of the actuator and an internal side 53 of the mechanism housing 34 until it strikes the anvil 32 (FIG. 3E). The force applied to the anvil 32 by the striker 40 is in turn applied to the cap 56 by the anvil 32 and thus applied to the bottom side 18a of the filter 18 by the cap 56, thereby dislodging dust and other debris from the filter 18. When the actuator 38 is released by the operator, the first spring 44 is almost completely expanded and the second spring 50 is then able to release its stored potential energy to push the striker 40 back toward the first striker position, which in turn causes the first spring 44 to push the actuator 38 back toward the first actuator position, returning the filter cleaning mechanism 22 to the state shown in FIG. 3A. Around the time when the striker 40 reaches the position shown in FIG. 3D, the striker 40 is redirected underneath the internal shoulder 48 of the mechanism housing 34, as shown in FIGS. 3C-3A, because the perch axis 46 is oblique with respect to the anvil axis 36, thus causing the first spring 44 to direct the striker 40 away from the anvil axis 36 and underneath the shoulder 48.

Figure 4:
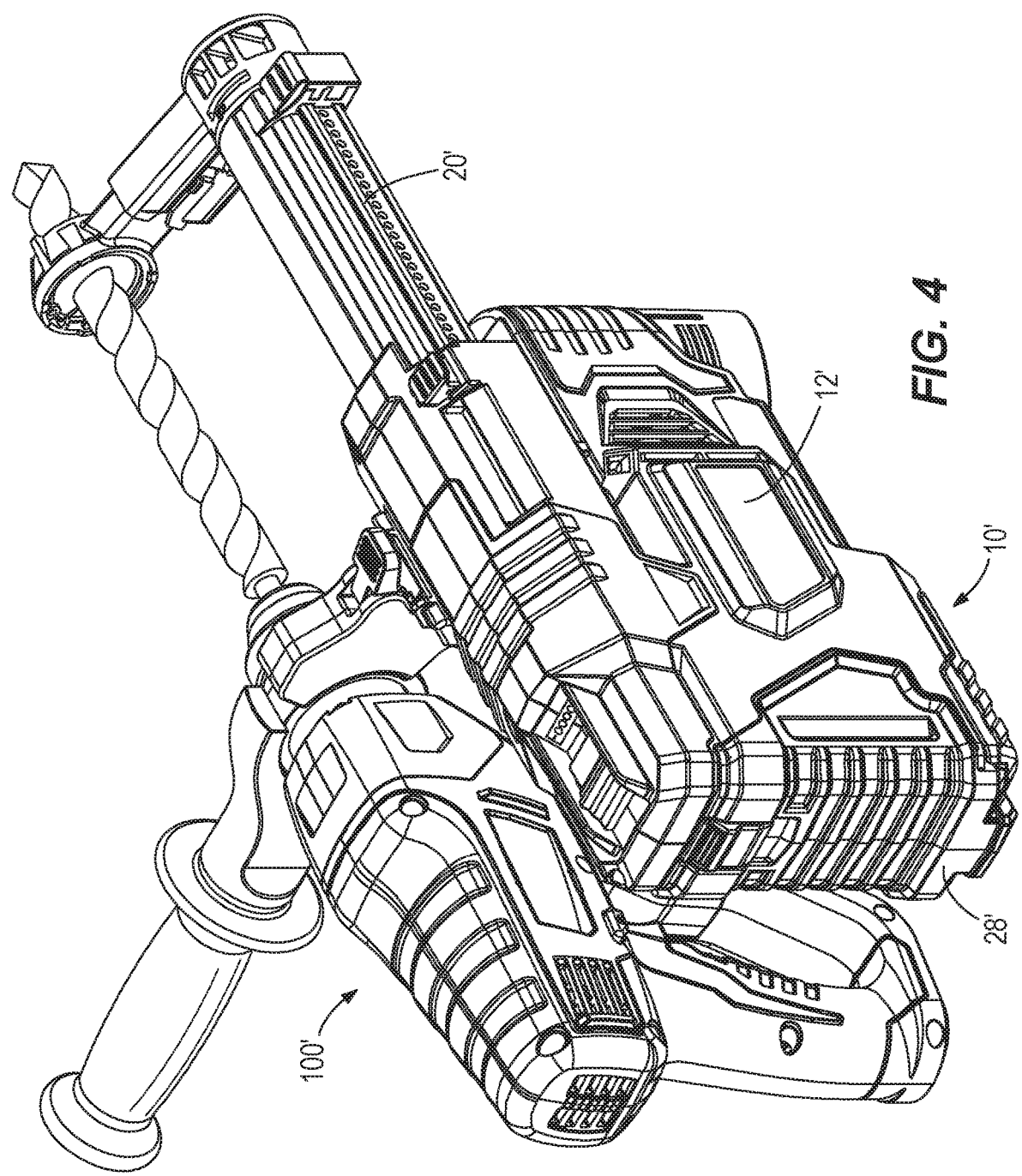
FIG. 4 is a perspective view of a dust collector in accordance with another embodiment of the invention attached to a rotary power tool.
Figure 5A:
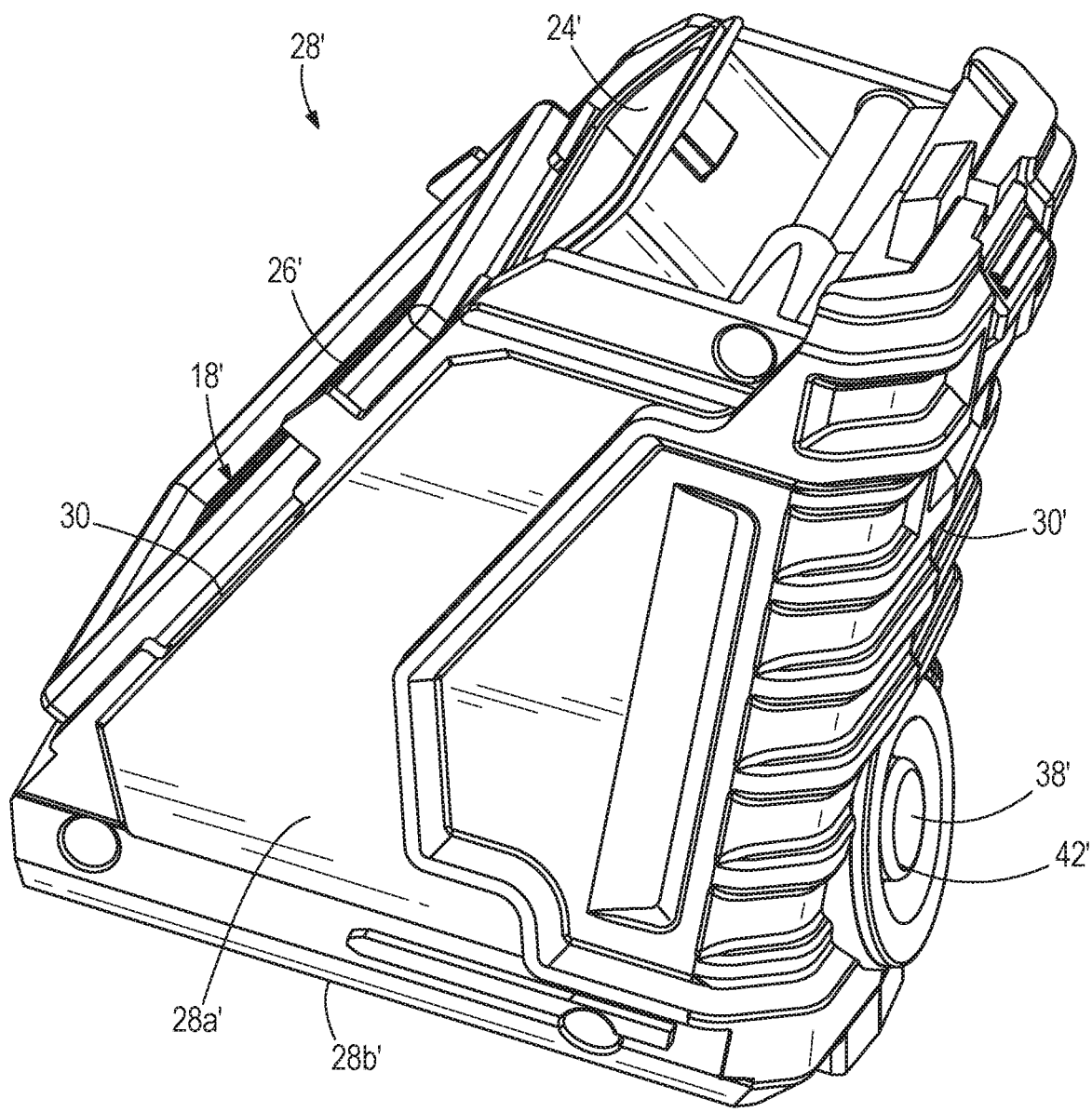
FIG. 5A is a perspective view of a dust container of the dust collector of FIG. 4.
Figure 5B:
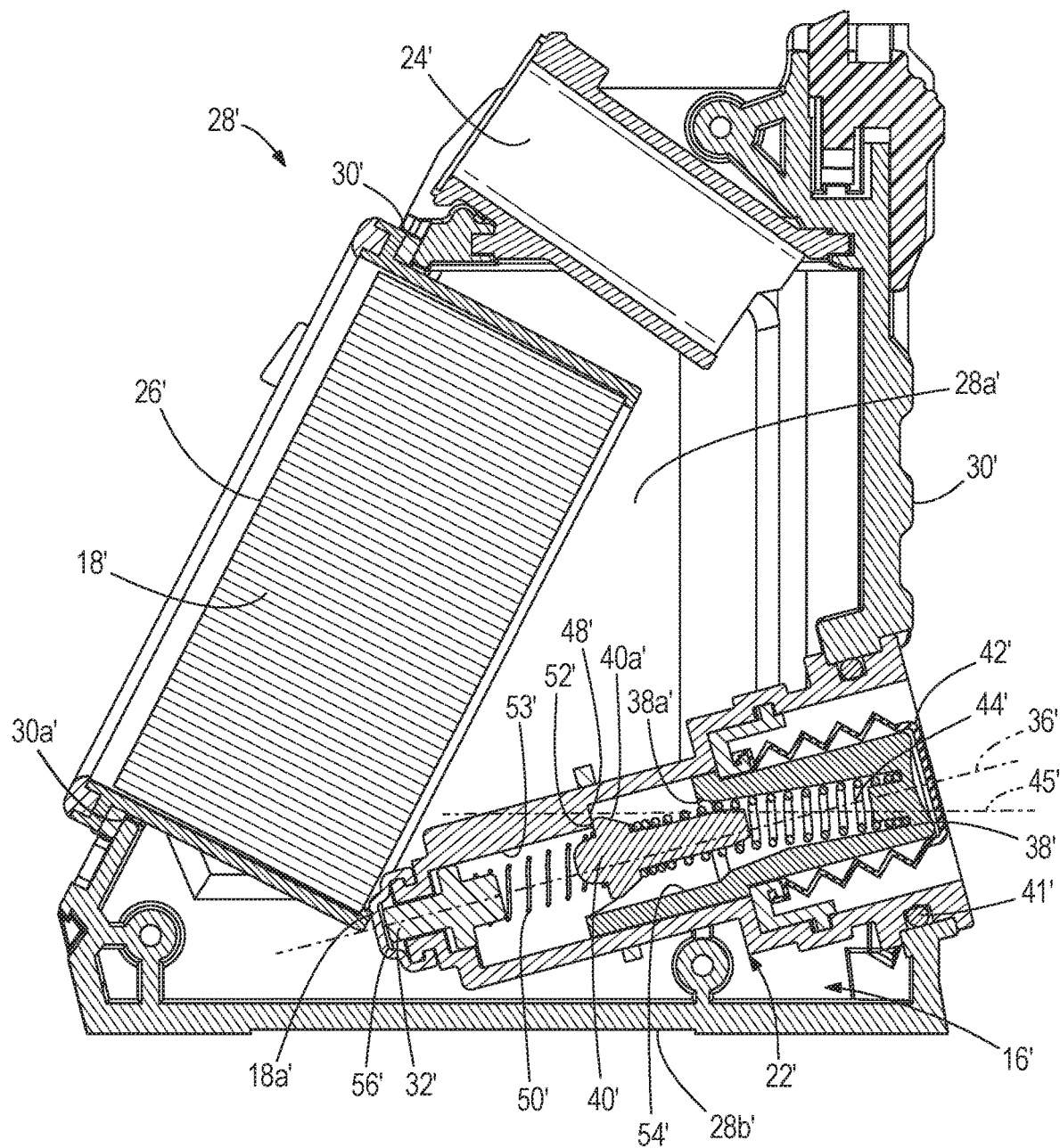
FIG. 5B is a cross-sectional view of the dust container 5A.

FIGS. 4, 5A and 5B illustrates another embodiment of a dust collector 10' for use with a rotary power tool 100', with like components designated with an apostrophe. The dust collector 10' and dust container 28' are substantially similar to the dust collector 10 and dust container 28 of FIGS. 1-3 except for the following differences explained below. Specifically, the actuator 38' of the filter cleaning cleaning mechanism 22' is positioned in an end wall 30' instead of the bottom wall 28b'. Also, the dust container 28' has an approximate triangle shape instead of the approximately L-shape of the dust container 28.

Figure 6A:
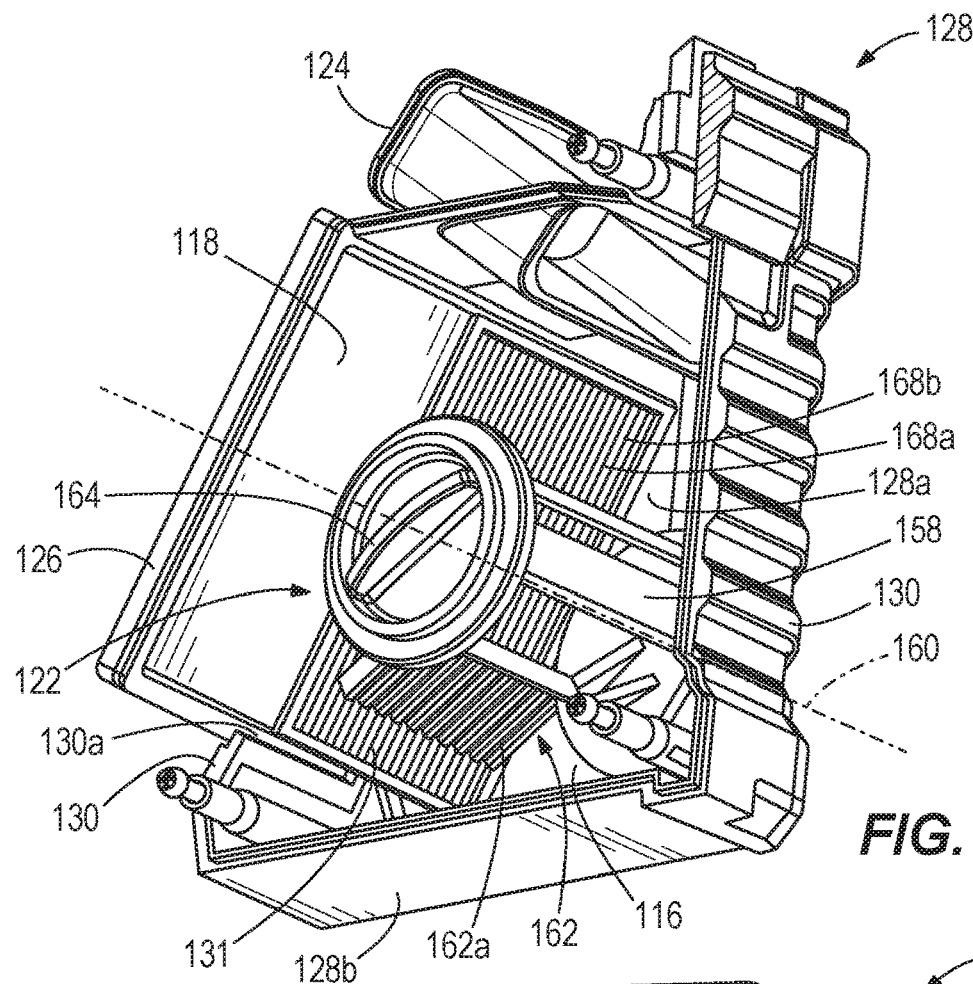
FIG. 6A is a perspective view of a dust container of the dust collector of FIG. 4, in accordance with another embodiment of the invention, with portions removed.
Figure 6B:
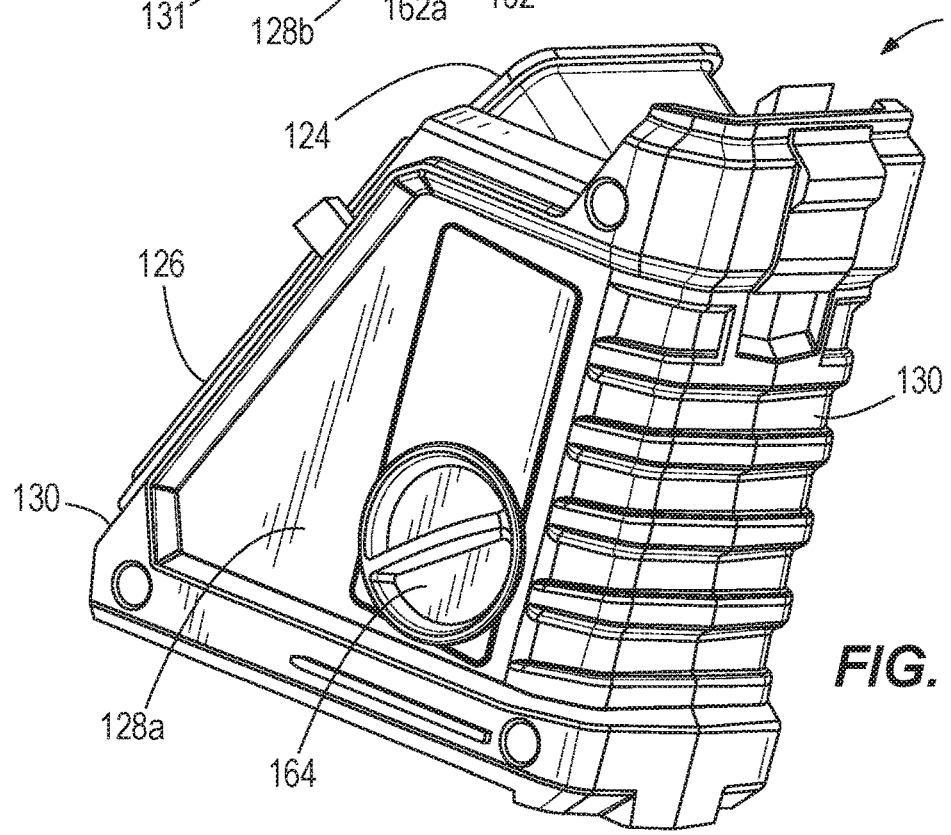
FIG. 6B is a perspective view of the dust container of FIG. 6A.

FIGS. 6A and 6B illustrate another embodiment of a dust container 128 that is similar in some respects to dust container 28', with like components identified with like reference numerals plus "100" and the apostrophe removed. The dust container 128 itself is largely identical to dust container 28', while the filter cleaning mechanism 122 has changed, as described below. In the embodiment of FIGS. 6A and 6B, the filter cleaning mechanism 122 includes a carrier 158 pivotably supported within the dust container 128 about a carrier axis 160 (FIG. 6A). More specifically, the carrier 158 is pivotably supported by at least one of the side walls 128a of the dust container 128. In the embodiment illustrated in FIGS. 6A and 6B, the carrier 158 is pivotably supported by two of the side walls 128a. The carrier 158 includes a cleaning element 162 extending away from the carrier axis 160 for contacting an inlet surface 131 of the filter 118. The filter cleaning mechanism 122 also includes one or more knobs 164, with each knob arranged on and rotatably supported by the exterior of one of the side walls 128a. The knobs 164 are coupled for movement with the carrier 158, such that pivoting the one or more knobs 164 about the carrier axis 160 causes pivoting of the carrier 158 and the cleaning element 162 about the carrier axis 160 to sweep debris from the inlet surface 124 of the filter 118. In the illustrated embodiment, the filter 118 includes a plurality of pleats 168a and a plurality of valleys 168b arranged along the filter 118, with each valley 168b being arranged between a pair of adjacent pleats 168a. In the illustrated embodiment, the cleaning element 162 is a plurality of comb teeth 162a that are configured to sweep through the valleys 168b when the comb teeth 162a are pivoted about the carrier axis 160. As such, rotation of the knob 164 allows the comb teeth 162a to sweep debris from the valleys 168b.

Figure 7:
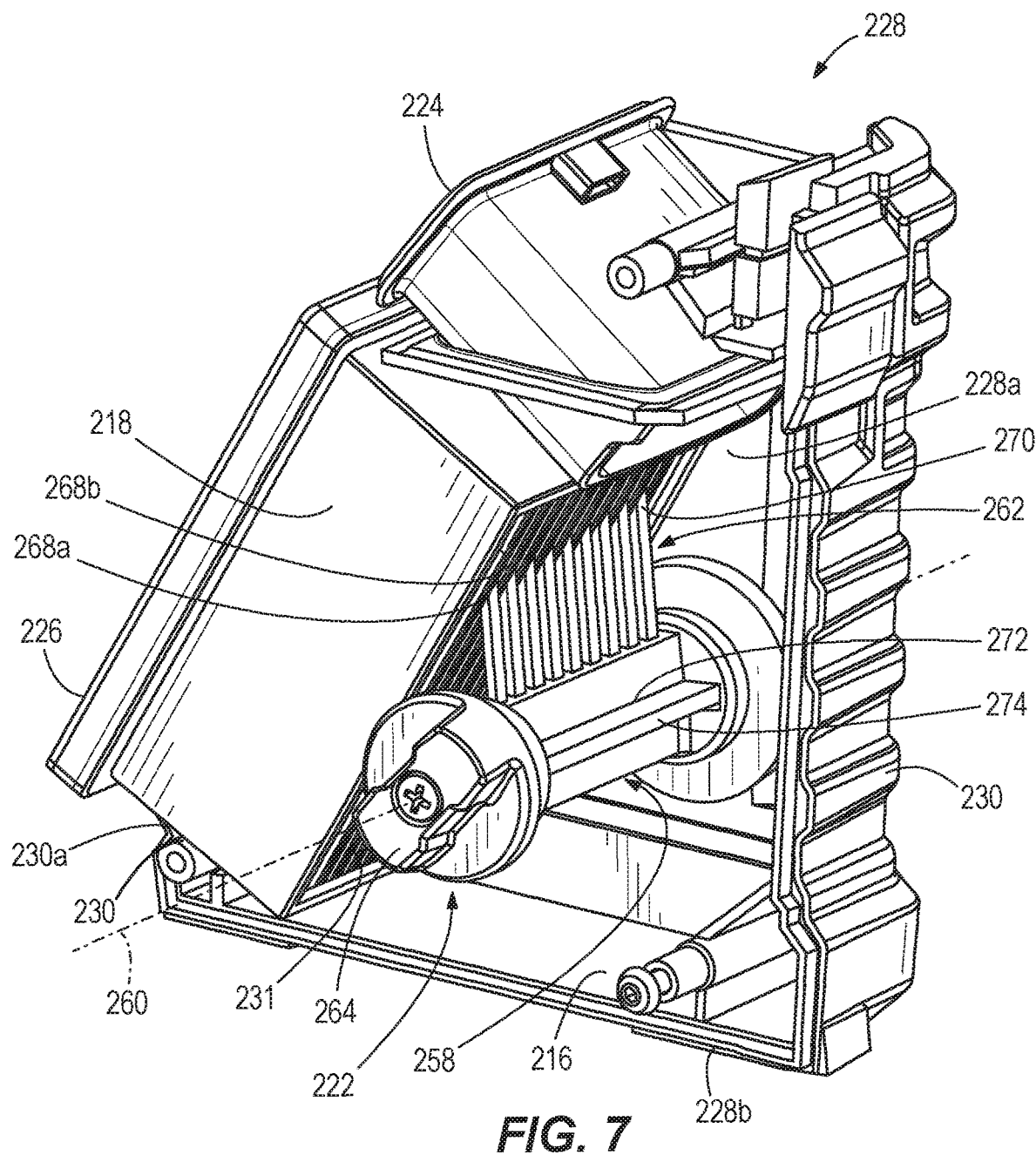
FIG. 7 is a perspective view of a dust container of the dust collector of FIG. 4 in accordance with another embodiment of the invention, with portions removed.

FIG. 7 illustrates another embodiment of a dust container 228 that is similar in some respects to dust container 28', with like components identified with like reference numerals plus "200" and the apostrophe removed. The dust container 228 itself is largely identical to dust container 28', while the filter cleaning mechanism 222 has changed, as described below. With reference to FIG. 7, the cleaning element 262 on the carrier 258 of the dust container assembly 228 is a brush including multiple groups of bristles 270. The carrier 258 is pivotably supported by at least one of the side walls 228a of the dust container 228. In the shown embodiments, the carrier 258 is pivotably supported by two of the side walls 228a. Pivoting the one or more knobs 264 back and forth about the carrier axis 260 allows the cleaning element 262 to sweep the inlet surface 230 of the filter 218. In some embodiments, the bristles 270 are configured to sweep through the valleys 268b of the filter 218 as the cleaning element 262 pivots about the carrier axis 260. The carrier 258 is supported by the one or more knobs 264 and the knobs 264 are keyed to a shaft 272 of the carrier 258 through a plurality of flats 274, thus ensuring co-rotation of the carrier 258 and the knobs 264. The cleaning element 262 has a predefined range of rotation about the carrier axis 260 and one of the cleaning element 262, carrier 258, or knob 264 includes stops to prevent the cleaning element 262 from rotating beyond the range of rotation. For example, the stops may be arranged such that the bristles 270 are prevented from leaving the inlet surface 231 of the filter 218. Seals are included between the carrier 258 and the dust container 228 to prevent leakage of air or debris outside the dust container 228.

Figure 8:
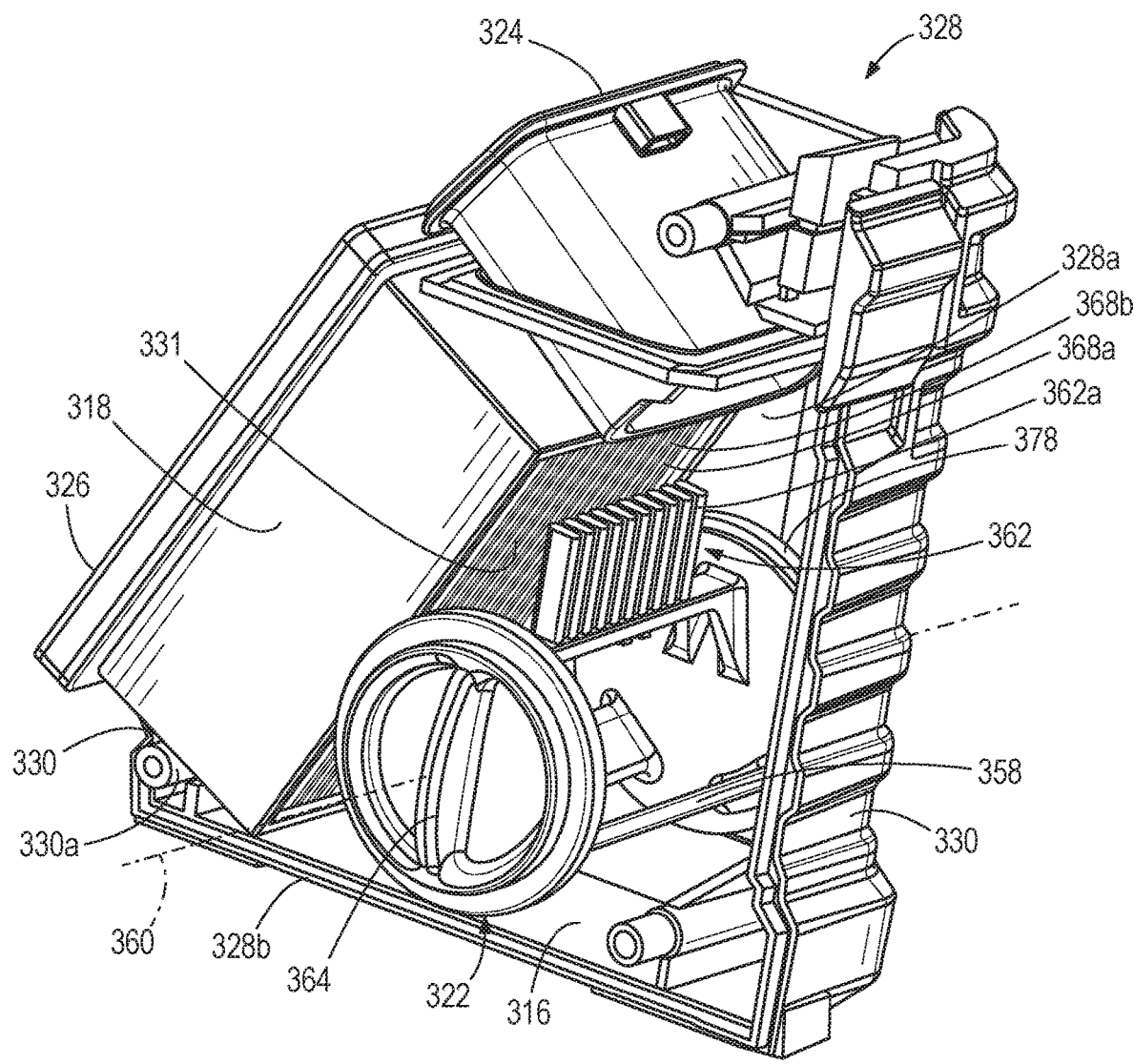
FIG. 8 is a perspective of a dust container of the dust collector of FIG. 4 in accordance with another embodiment of the invention, with portions removed.

FIG. 8 illustrates yet another embodiment of a dust container 328 that is similar in some respects to dust container 28', with like components identified with like reference numerals plus "300" and the apostrophe removed. The dust container 328 itself is largely identical to dust container 28', while the filter cleaning mechanism 322 has changed, as described below. With reference to FIG. 8, the cleaning element 362 on the carrier 358 of the dust container 328 is a plurality of comb teeth 362*a*. The cleaning element 362 is attached to the carrier 358, which is coupled to the one or more knob 364. The carrier 358 is pivotably supported by at least one of the side walls 328*a* of the dust container 328 via the one or more knobs 364. In the embodiment illustrated in FIG. 8, the carrier 358 is pivotably supported by two of the side walls 328*a* via oppositely arranged knobs 364. Rotating the carrier 358 back and forth rotates the comb teeth 362*a* to comb the filter 318 between its respective pleats 368*a* and remove debris from the valleys 368*b*. The cleaning element 362 is supported by the dust container side walls 328*a*, and the knob 364 is integrated with carrier 358. The cleaning element 362 has a predefined range of rotation about the carrier axis 360 and one of the cleaning element 362, carrier 358, or knobs 364 include stops to prevent the cleaning element 362 from rotating beyond the range of rotation. For example, the stops may be arranged such that the comb teeth 362*a* are prevented from moving off of the planar surface 330 of the filter 318. Seals are included between the carrier 358 and the dust container 328 to prevent leakage of air or debris outside the dust container 328.

Figure 9A:
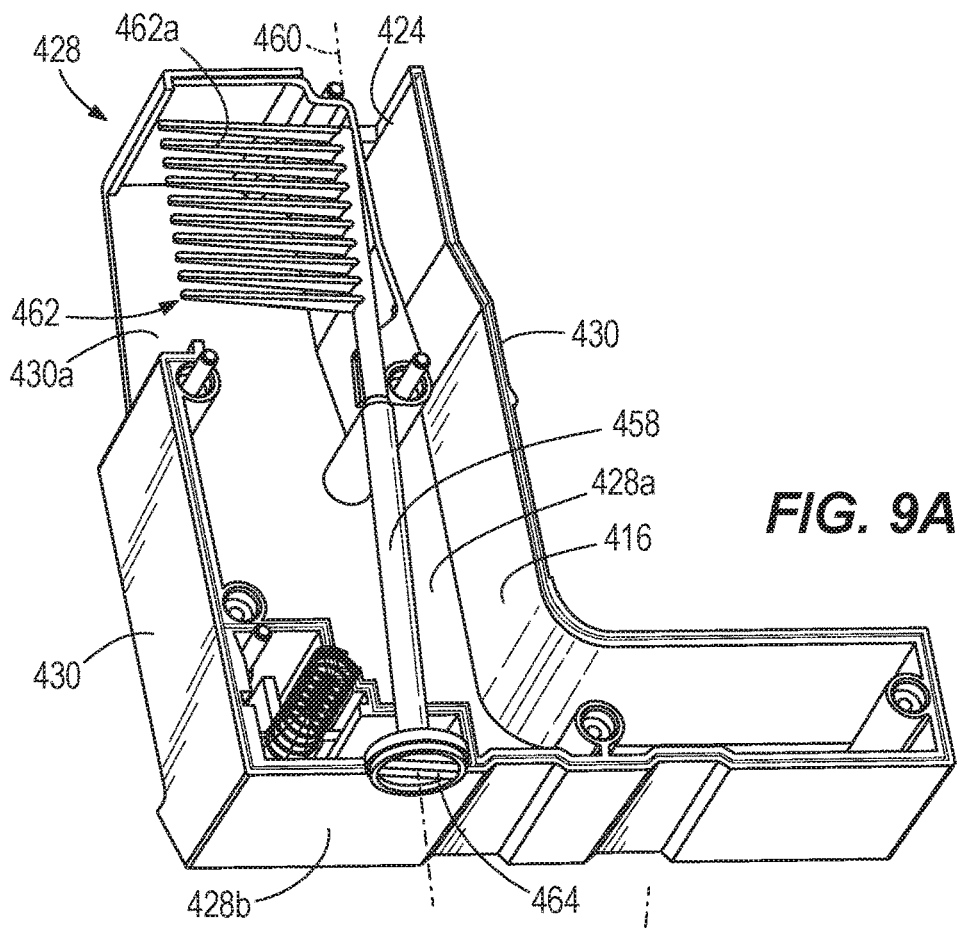
FIG. 9A is a perspective view of a dust container of the dust collector of FIG. 1 in accordance with another embodiment of the invention with portions removed.
Figure 9B:
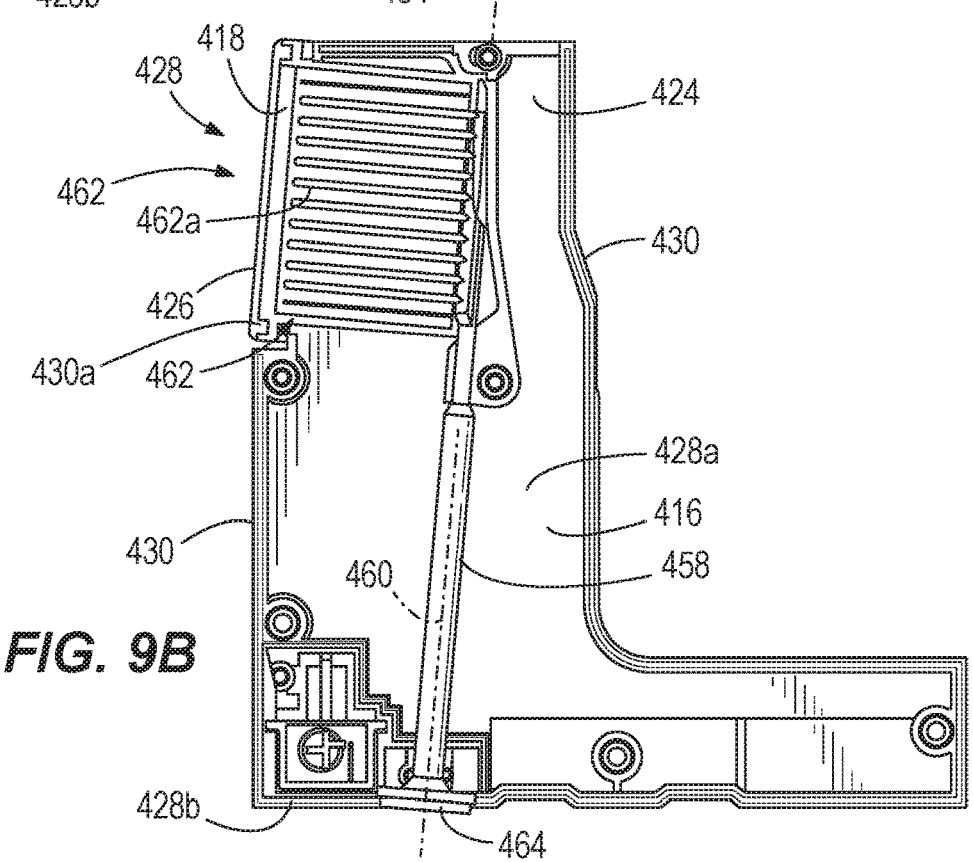
FIG. 9B is a cross-sectional view of the dust container of FIG. 9A.

FIGS. 9A-9C illustrates another embodiment of a dust container 428 that is similar in some respects to dust container 28, with like components identified with like reference numerals plus "400." The dust container 428 itself is largely identical to dust container 28', while the filter cleaning mechanism 422 has changed, as described below. With reference to FIGS. 9A-9C, the cleaning element 462 on the carrier 458 is a plurality of comb teeth 462*a* arranged within valleys 468*b* between pleats 468*a* of the filter 418. The cleaning element 462 is attached to the carrier 458, which is coupled to the knob 464. The carrier 458 is pivotably supported by the bottom wall 428*b* of the dust container 428. Similarly to the embodiments shown in FIGS. 6-8, pivoting the carrier 458 back and forth about the carrier axis 460 pivots the cleaning element 462 to wipe the valleys 468*b* between the pleats 468*a*. With reference to FIG. 9C, each tooth 462*a* is, within each valley 468*b*, configured to sweep approximately 67% of the surface area of each pleat 468*a* of the filter 418.

Figure 10:
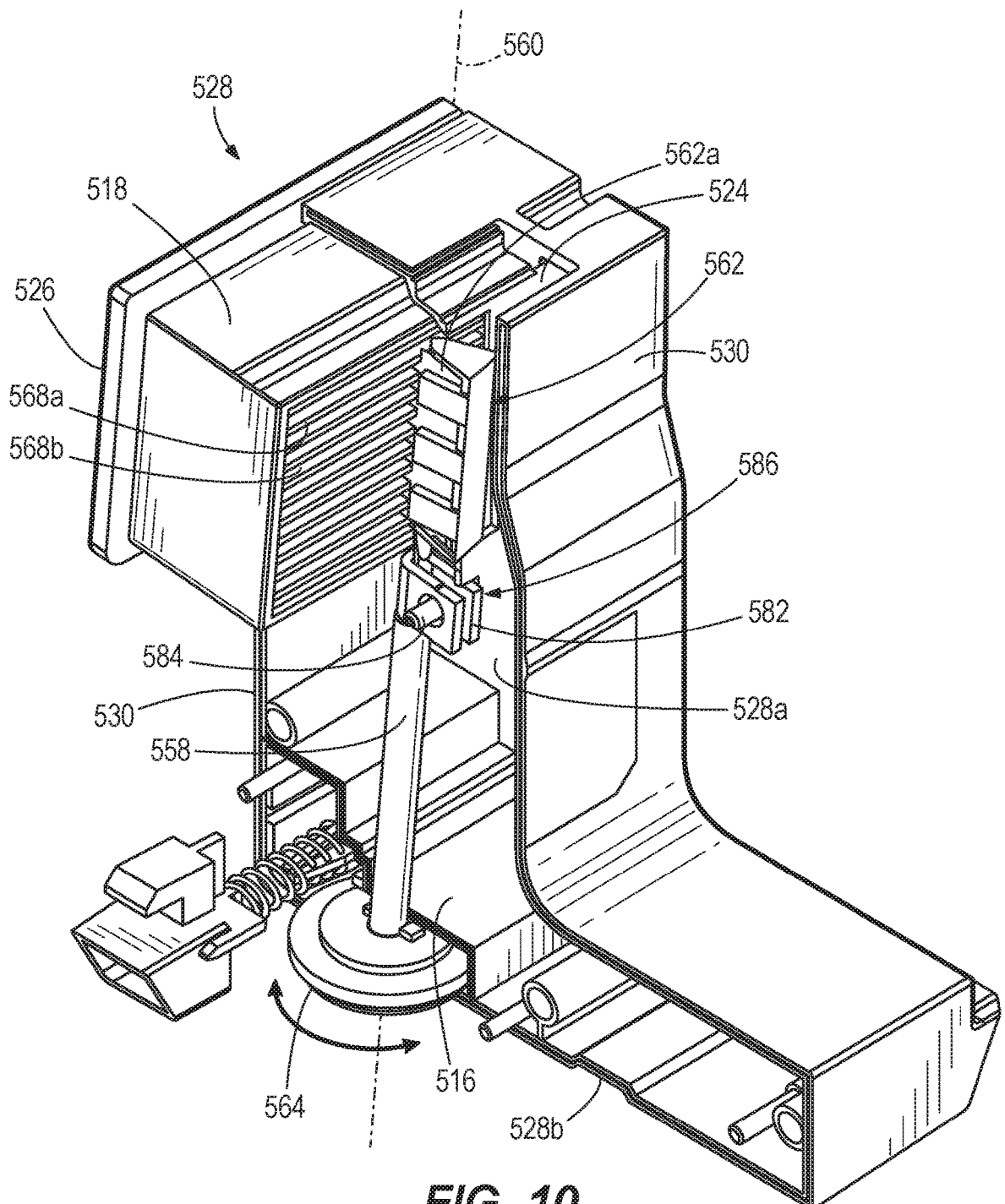
FIG. 10 is a perspective view of a dust container of the dust collector of FIG. 1, in accordance with another embodiment of the invention.

FIG. 10 illustrates yet another embodiment of a dust container 528 that is similar in some respects to dust container 28, with like components identified with like reference numerals plus "500." The dust container 528 itself is largely identical to dust container 28', while the filter cleaning mechanism 522 has changed, as described below. With reference to FIG. 10, the cleaning element 562 on the carrier 558 of the dust container 528 is a brush including multiple groups of bristles 570. The cleaning element 562 is attached to the carrier 558, which is coupled to the knob 564. The carrier 564 includes stops to limit the degree of rotational freedom it has about carrier axis 560. The carrier 558 is pivotably supported by the bottom wall 528*b* of the dust container 528. As such, rotation of the carrier 558 also imparts rotational movement to the cleaning element 562 across the filter 518, sweeping debris from the filter pleats 568*a*. Rather than being supported by the bottom wall of the dust container 528, the carrier 558 is rotatably supported by a clip 582, which is fastened to a screw boss 584 on the dust container 528.

Figure 11A:
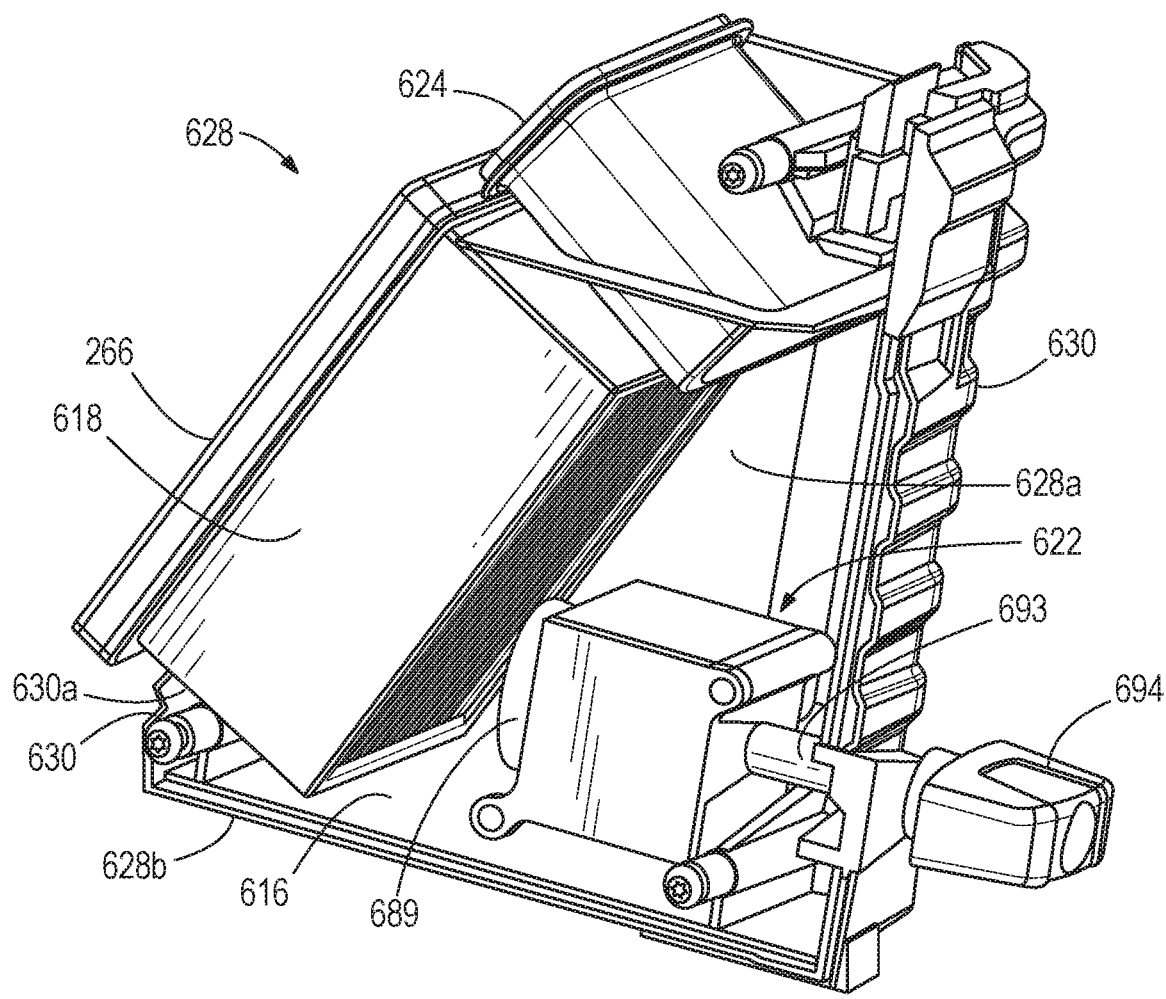
FIG. 11A is a perspective view of a dust container of the dust collector of FIG. 4, in accordance with another embodiment of the invention, with portions removed.
Figure 11B:
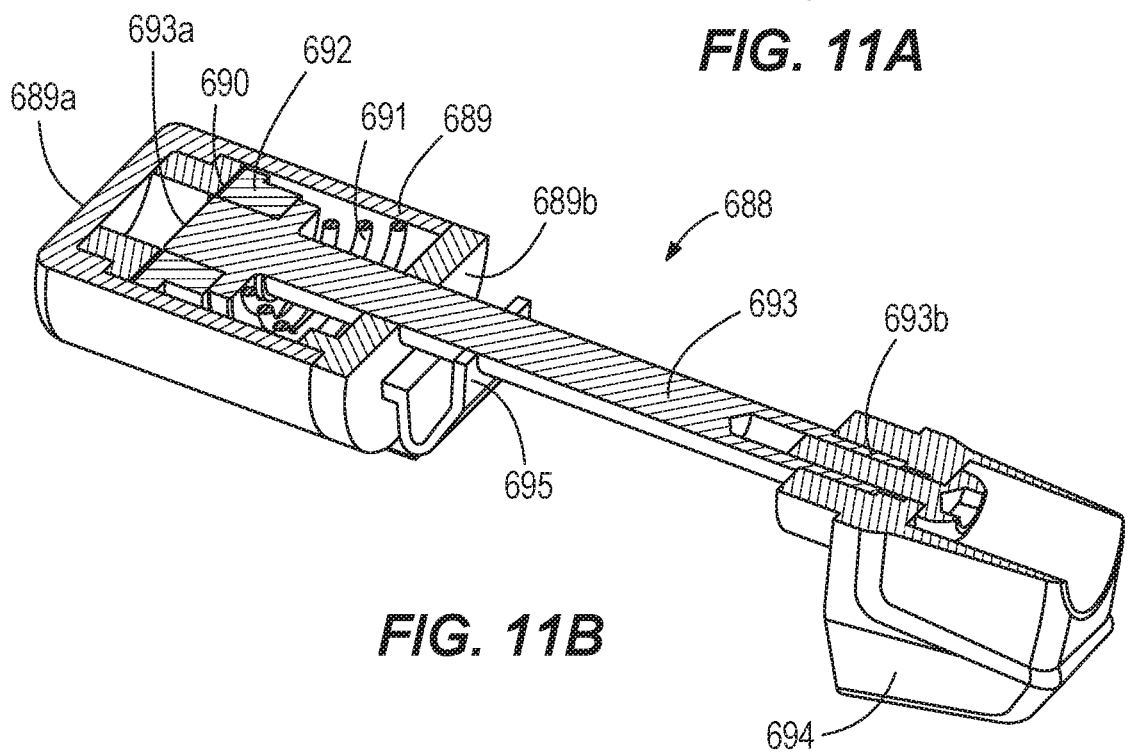
FIG. 11B is a cross-sectional view of a ratchet assembly of the dust container of FIG. 11A.

FIGS. 11A and 11B illustrate another embodiment of a dust container 628 that is similar to the dust container 28', with like components identified with like reference numerals plus "600" and the apostrophe removed. The dust container 628 itself is largely identical to dust container 28', while the filter cleaning mechanism 622 has changed, as described below. The filter cleaning mechanism 622 includes a ratchet assembly 688 for imparting vibration to the filter 618 to shake or dislodge dust or other debris from the inlet surface of the filter 618. The ratchet assembly 688 include a ratchet housing 689 arranged against the filter 618. The ratchet housing 689 includes a pawl 690 positioned on a first end 689*a* of the ratchet housing 689, a first spring 691 positioned on a second end 689*b* of the ratchet housing 689, and a ratchet member 692 positioned between the pawl 690 and the first spring 691. Thus, the first spring 691 biases the ratchet member 692 against the pawl 690. The ratchet member 692 may rotate relative to the ratchet housing 689 and the pawl 690. The ratchet housing 689 is rotationally constrained with respect to the dust container 628, but is permitted to move axially. Specifically, the ratchet member 692 and pawl 690 include mated teeth that are configured to slide relative to each other in response to rotation of the ratchet member 692 relative to the pawl 690, imparting axial displacement to the ratchet housing 689. A shaft 693 extends into the ratchet housing 689 having a first end 693*a* extending into the ratchet housing 689 and coupled to the ratchet member 692, and an opposite second end 693*b* coupled to a knob 694. Thus, rotation of the knob 694 imparts rotation to the shaft 693, which rotates the ratchet member 692 relative to the ratchet housing 689. The ratchet assembly 688 further includes a second spring 695 coupled to an external surface of the housing 689 and surrounding the shaft 693. The second spring 695 biases the first end 689*a* of the ratchet housing 689 against the filter 618. In the illustrated embodiment, the second spring 695 is a resilient clip. In some embodiments, instead of a resilient clip, a plurality of wave washers can be used to bias the housing ratchet 689 toward the filter 618.

As a user rotates the knob 694, the first spring 691 biases the ratchet member 692 against the pawl 690, causing the teeth of the ratchet member 692 and pawl 690 to slide relative to each other in response to rotation of the ratchet member 692 relative to the pawl 690. This in turn causes the ratchet housing 689 to undergo reciprocating axial displacement against the filter 618 to dislodge dust and other debris from the inlet surface of the filter 618.

Figure 12A:
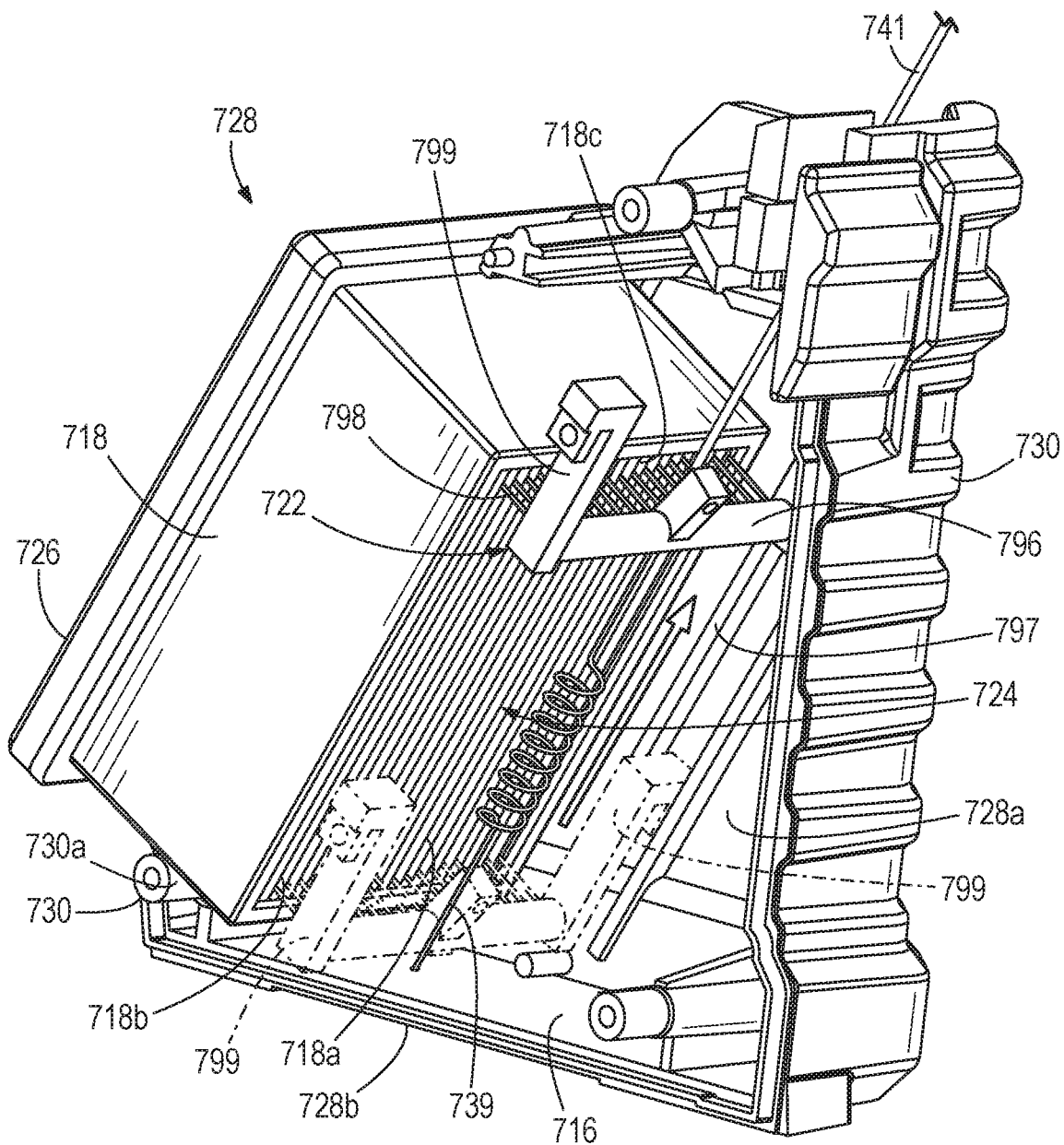
FIG. 12A is a perspective view of a dust container of the dust collector of FIG. 4, in accordance with another embodiment of the invention, with portions removed.

FIG. 12A illustrates another embodiment of a dust container 728 that is similar to the dust container 28', with like components identified with like reference numerals plus "700" and the apostrophe removed. With reference to FIG. 12A, the filter cleaning mechanism 722 includes a sweeper 796 positioned against the filter 718 via one or more rails 797. Specifically, the sweeper 796 includes a plurality of guide arms 799 slideably arranged in the rails 797. The rails 797 are substantially parallel and offset from the edges of the filter 718 such that the sweeper 796 extends substantially parallel to the inlet surface 730 of the filter 718. The arms 799 of the sweeper 796 are slidably positioned within the rails 797 such that the sweeper 796 may slide along the length of the filter 718. The sweeper 796 includes several blades 798 extending perpendicularly away from the sweeper 796 for contacting the inlet surface 730 of the filter 718. In other embodiments, instead of blades 798, comb teeth or bristles may be used.

As shown in FIG. 12A, the filter 718 includes a plurality of pleats 768a and valleys 768b arranged between a first end 718b of the filter 718 and a second end 718c of the filter 718. Specifically, each of the valleys 768b is arranged between a pair of adjacent pleats 768a. The blades 798 of the sweeper 796 are positioned within the valleys 768b of the filter 718 in order to remove any dust or debris caught between the pleats 768a. In some embodiments, the blades 798 may be bristles of a brush in order to protect the face of the filter 718. In some embodiments, the filter cleaning mechanism 722 may include a spring 739 biasing the sweeper 796 toward the first end 718b of the filter 718 and away from the second end 718c of the filter 718. Additionally, the filter cleaning mechanism 722 may include a pull cord 741 coupled to the sweeper 796. A user may pull the pull cord 741 to translate the sweeper 796 along the filter 718 from the first end 718b to the second end 718c. As the sweeper 796 is moving, either via the biasing member or the pull cord 741, the blades 798 move within the valleys 768b between the first and second ends 718b, 718c of the filter 718 in order to remove any dust and/or debris in the valleys 768b.

Figure 12B:
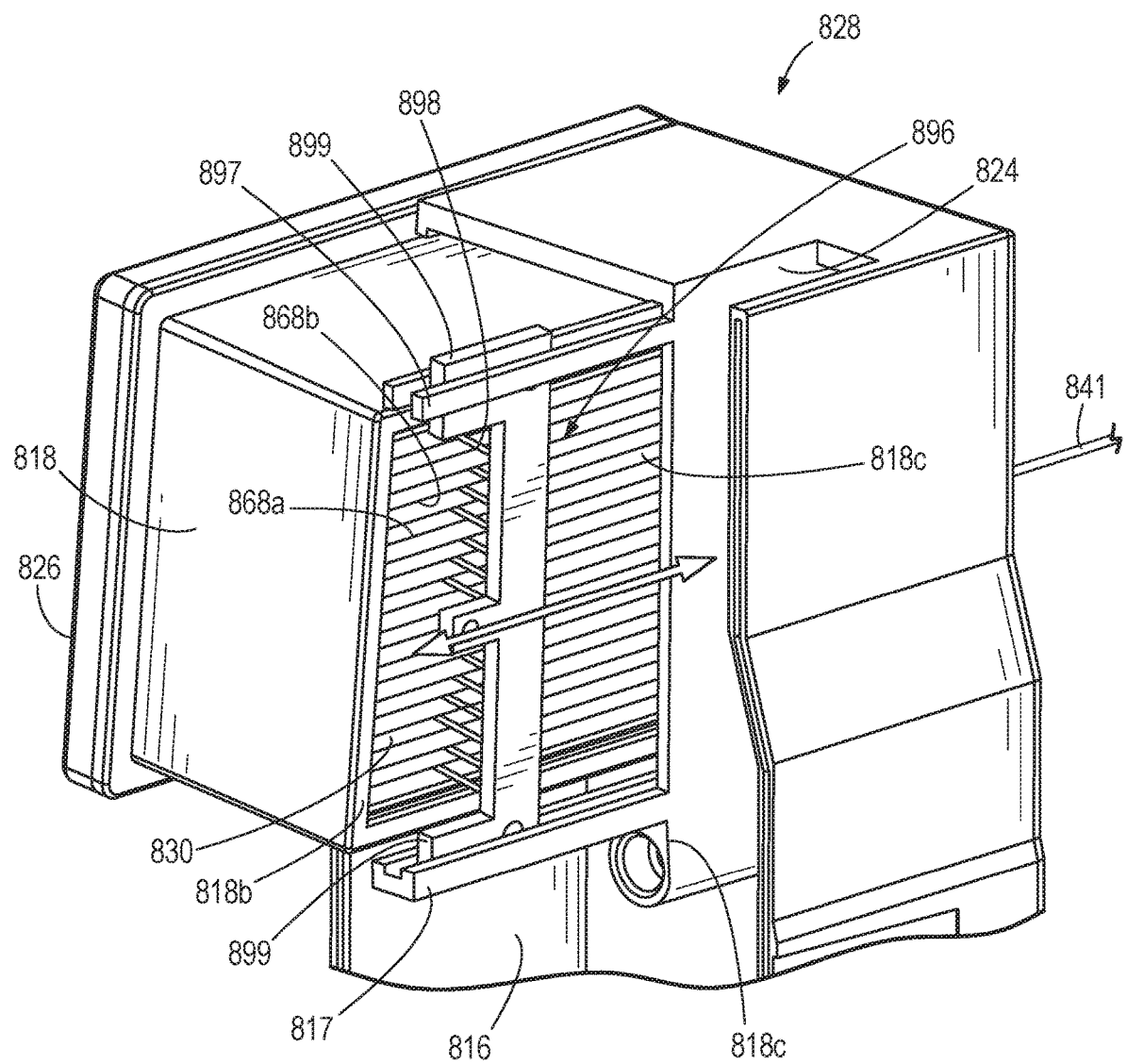
FIG. 12B is perspective view of a dust container of the dust collector of FIG. 1, in accordance with another embodiment of the invention, with portions removed.

FIG. 12B illustrates another embodiment of a dust container 828 that is similar to the dust container 28, with like components identified with like reference numerals plus "800". With reference to FIG. 12B, the filter cleaning mechanism 822 includes a sweeper 896 positioned against the filter 818 via one or more rails 897. Specifically, the sweeper 896 includes a plurality of guide arms 899 slideably arranged in the rails 897. The rails 897 are substantially parallel and offset from the edges of the filter 818 such that the sweeper 896 extends substantially parallel to the inlet surface 830 of the filter 818. The arms 899 of the sweeper 896 are slidably positioned within the rails 897 such that the sweeper 896 may slide along the length of the filter 818. The sweeper 896 includes several blades 898 extending perpendicularly away from the sweeper 896 for contacting the inlet surface 830 of the filter 818. In other embodiments, instead of blades 898, comb teeth or bristles may be used.

As shown in FIG. 12B, the filter 818 includes a plurality of pleats 868a and valleys 868b arranged between a first end 818b of the filter 818 and a second end 818c of the filter 818. Specifically, each of the valleys 868b is arranged between a pair of adjacent pleats 868a. The blades 898 of the sweeper 896 are positioned within the valleys 868b of the filter 818 in order to remove any dust or debris caught between the pleats 868a. In some embodiments, the blades 898 may be bristles of a brush in order to protect the face of the filter 818. In some embodiments, the filter cleaning mechanism 822 may include a spring biasing the sweeper 896 toward the first end 818b of the filter 818 and away from the second end 818c of the filter 818. Additionally, the filter cleaning mechanism 822 may include a pull cord 841 coupled to the sweeper 896. A user may pull the pull cord 841 to translate the sweeper 896 along the filter 818 from the first end 818b to the second end 818c. As the sweeper 896 is moving, either via the biasing member or the pull cord 841, the blades 898 move within the valleys 868b between the first and second ends 818b, 818c of the filter 818 in order to remove any dust and/or debris in the valleys 868b.

Various features of the invention are set forth in the following claims.

What is claimed is:

1. A dust collector for use with a hand-held power tool, the dust collector comprising:
a housing;
a telescoping suction pipe coupled to the housing;
a suction fan positioned in the housing and operable to generate a vacuum in the suction pipe;
a dust container coupled to the housing and positioned upstream of the fan;
a filter at least partially arranged in the dust container; and
a filter cleaning mechanism including
an anvil,
a striker moveable between a first striker position, in which the striker is spaced from the anvil, and a second striker position, in which the striker is in contact with the anvil,
an actuator moveable between a first actuator position and a second actuator position, in which the actuator is moved closer to the anvil than in the first position, and
a first spring biasing the striker toward the anvil,
wherein in response to the actuator being depressed, the actuator is moved from the first actuator position to the second actuator position and the first spring moves the striker from the first striker position to the second striker position, such that the anvil impacts the filter, thereby dislodging dust and other debris therefrom.

2. The dust collector of claim 1, wherein the filter cleaning mechanism further includes a second spring positioned between the anvil and the striker, the second spring configured to bias the striker away from the anvil.

3. The dust collector of claim 2, wherein the second spring moves the striker from the second striker position to the first striker position in response to the actuator being released.

4. The dust collector of claim 3, wherein the second spring concurrently moves the actuator from the second actuator position to the first actuator position in response to the actuator being released.

5. The dust collector of claim 4, wherein the second spring has a stiffness that is less than a stiffness of the first spring.

6. The dust collector of claim 1, wherein the filter cleaning mechanism further includes a mechanism housing coupled to the dust container, and wherein the anvil, the striker, and the first spring are arranged within the mechanism housing.

7. The dust collector of claim 6, further including an 0-ring arranged between the mechanism housing and the dust container.

8. The dust collector of claim 6, wherein in the first striker position, the striker is engaged against an internal shoulder of the mechanism housing, and in response to the actuator moving to the second actuator position, the striker is moved off the internal shoulder by the actuator.

9. The dust collector of claim 8, wherein the striker includes a striker shoulder that is engaged with the internal shoulder when the striker is in the first striker position.

10. The dust collector of claim 9, wherein the actuator includes a bore in which the first spring is positioned, wherein the bore is at least partially defined by an annular tapered cam surface, and wherein in response to the actuator moving to the second actuator position, the annular tapered cam surface is engageable with the striker to disengage the striker shoulder from the internal shoulder.

11. The dust collector of claim 10, wherein the second spring has a stiffness that is less than a stiffness of the first spring, and wherein in response to the striker shoulder disengaging from the internal shoulder, the first spring rebounds to displace the striker toward the second striker position, which also compresses the second spring.

12. The dust collector of claim 1, wherein the first spring is seated about a perch in the actuator, and wherein the perch defines a perch axis that is offset relative to an anvil axis defined by the anvil.

13. The dust collector of claim 12, wherein in the first striker position, the striker is not coaxial with the anvil axis, and in the second striker position, the striker is coaxial with the anvil axis.

14. The dust collector of claim 1, wherein the filter cleaning mechanism further comprises
   a mechanism housing coupled to the dust container, and
   a bellows at least partially surrounding an end of the actuator protruding from the mechanism housing.

15. The dust collector of claim 1, wherein the filter cleaning mechanism further comprises a cap positioned between the anvil and the filter, such that in response to the striker impacting the anvil upon reaching the second striker position, the cap vibrates the filter to dislodge the dust and the other debris therefrom.

16. A dust collector for use with a hand-held power tool, the dust collector comprising:
   a housing;
   a telescoping suction pipe coupled to the housing;
   a suction fan positioned in the housing and operable to generate a vacuum in the suction pipe;
   a dust container coupled to the housing and positioned upstream of the fan;
   a filter at least partially arranged in the dust container; and
   a filter cleaning mechanism including
      a mechanism housing having an internal shoulder,
      an anvil arranged within the mechanism housing and defining an anvil axis,
      a striker arranged within the mechanism housing and moveable between a first striker position, in which the striker is engaged against the internal shoulder and spaced from the anvil, and a second striker position, in which the striker is disengaged from the shoulder, in contact with the anvil, and coaxial with the anvil axis,
      an actuator moveable between a first actuator position and a second actuator position, in which the actuator is moved closer to the anvil than in the first position, the actuator including an actuator contact portion, and
      a spring biasing the striker against the internal shoulder of the mechanism housing and towards the anvil,
      wherein in response to movement of the actuator from the first actuator position to the second actuator position, the actuator contact portion moves the striker off of the shoulder and the spring moves the striker from the first striker position to the second striker position.

17. The dust collector of claim 16, wherein the filter cleaning mechanism further includes a second spring positioned between the anvil and the striker, the second spring configured to bias the striker away from the anvil.

18. The dust collector of claim 16, wherein the actuator includes a bore in which the first spring is positioned, wherein the bore is at least partially defined by an annular tapered surface, and wherein in response to the actuator moving to the second actuator position, the annular tapered surface is engageable with the striker to disengage the striker shoulder from the internal shoulder.

19. The dust collector of claim 16, further including an O-ring arranged between the mechanism housing and the dust container.

20. The dust collector of claim 16, wherein the filter cleaning mechanism further comprises a cap positioned between the anvil and the filter, such that in response to the striker impacting the anvil upon reaching the second striker position, the cap vibrates the filter to dislodge dust and other debris therefrom.

* * * * *